April 29, 1930.  T. L. HEDGPETH  1,756,121
SUPPORT FOR PORTABLE POWER SAWS
Filed Jan. 4, 1928  2 Sheets-Sheet 1
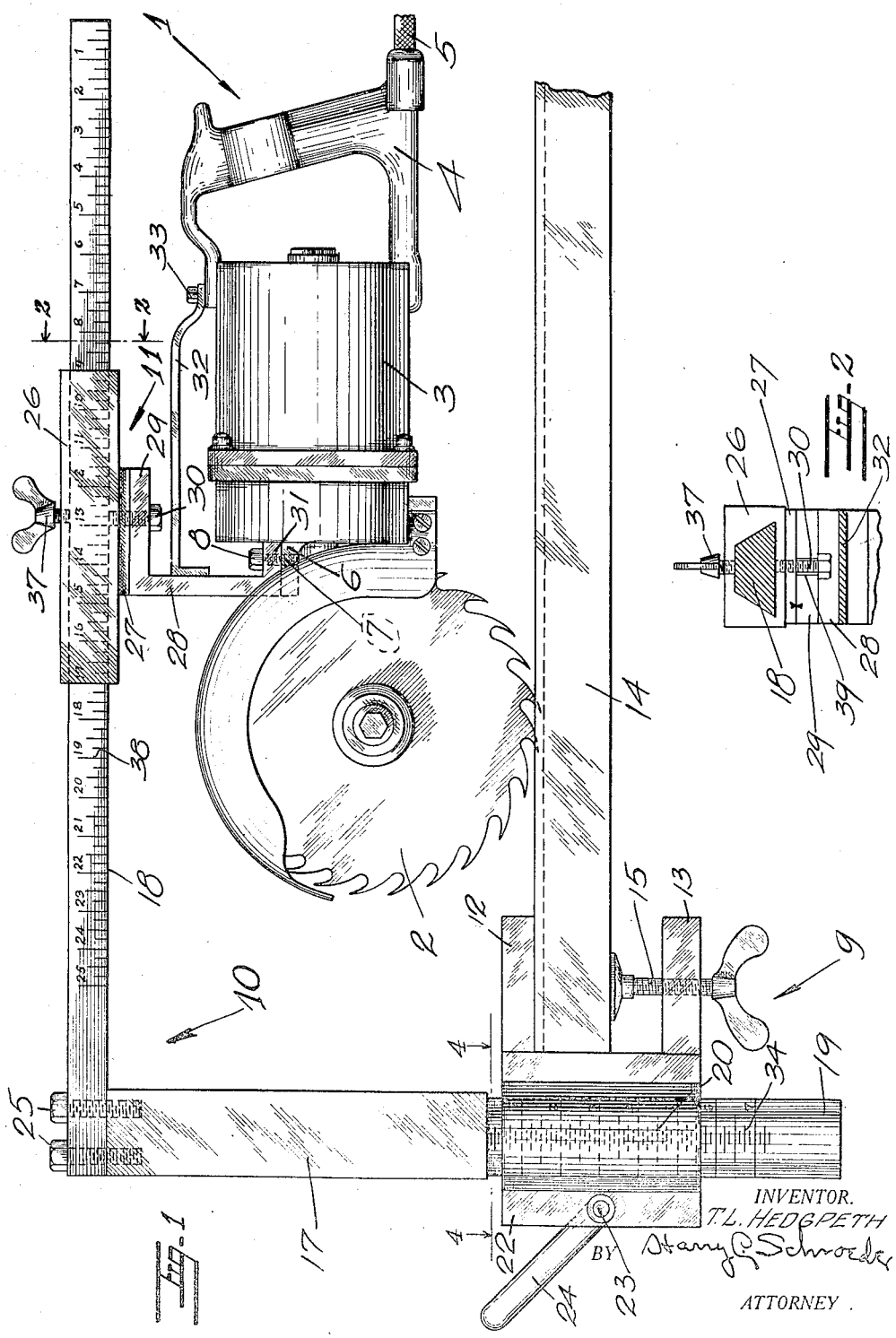
INVENTOR.
T. L. HEDGPETH
BY Harry C. Schroeder
ATTORNEY.

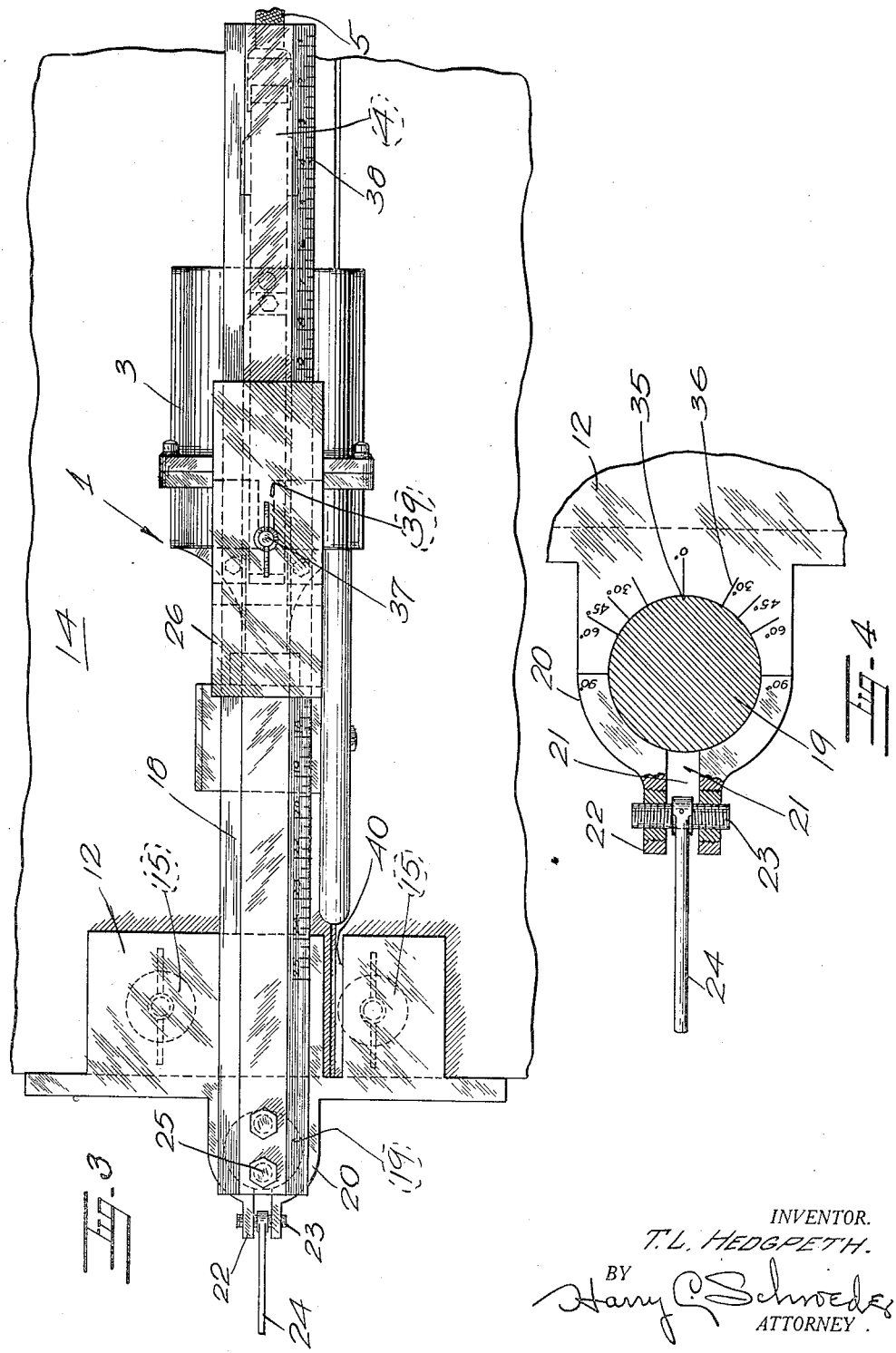

Patented Apr. 29, 1930

1,756,121

UNITED STATES PATENT OFFICE

THERON L. HEDGPETH, OF BERKELEY, CALIFORNIA

SUPPORT FOR PORTABLE POWER SAWS

Application filed January 4, 1928. Serial No. 244,411.

The invention forming the subject matter of this application relates to a portable supporting frame for electric hand saws and the like.

There are two general types of saws used at present in woodworking which operate from above the work, so that the layout marks on the wood are in plain sight below the blade, one is the stationary table saw and the other is the portable hand saw, both are driven by electric power. Although the table saw is accurate, it is impractical at construction jobs where it would be ineconomical to carry a heavy and cumbersome table saw to different locations. The hand saw on the other hand is readily portable and actually performs any cut in woodworking very similarly to the table saw, but it is guided and supported by hand, therefore it is quite often found that the cut did not follow exactly the layout marks in spite of the fact that the marks were in plain sight. It is almost impossible to carry and assemble a stationary table saw at places where a power hand saw may be readily applied, at the same time the hand saw could not replace completely the table saw because of the inaccuracy and the uncertainty of the labor available.

The primary object of the invention is the provision of a portable frame for accurately guiding a power driven or electric hand saw, the frame being so constructed as to readily permit the attachment of the electric handsaw thereto and to permit ready adjustment of the same for different angles and depth of cut.

Another object of the invention is the provision of a portable frame for an electric hand saw which frame may be readily clamped to any flat board and which frame may be readily adjusted to any height by means of minor adjustments to be made on the clamping means.

A further object of the invention is the provision of a portable frame for an electric hand saw, which frame may be readily secured to any flat board and which may be readily swung right or left to any angle. The handsaw may be fixedly secured to the arm of the frame at a determined angle and also in any position that may be advantageous for ripping or shaping or the like operations.

Another object of the invention is to provide a portable frame for an electric hand saw, which is highly useful and simple in construction. Convenience of arrangement, lightness and comparative inexpense of manufacture are further objects which have been borne in mind in the production and development of the invention.

With the above mentioned objects and other objects in view the invention consists in the novel construction and combination of parts hereinafter described, illustrated in the accompanying drawing and set forth in the claims hereto appended. It being understood that changes in the form, proportions, size and minor details of construction within the scope of the claims may be resorted to without departing from the spirit or sacrificing any of the advantages of the invention.

The invention is clearly illustrated in the accompanying drawing, in which

Figure 1 is a side elevation of the portable frame and the electric hand saw thereon, the frame being shown clamped to a board, Figure 2 is a sectional view of the sliding block and the swinging arm supporting the sliding block, the section being taken along the line 2—2 of Figure 1, Figure 3 is a plan view of the supporting frame and the electric hand saw thereon, Figure 4 is a sectional plan view of the frame column and clamp, taken on the line 4—4 of Figure 1.

In carrying out my invention I employ an electric hand saw, designated by the numeral 1. It is to be understood that any similar power driven hand saw may be used and supported on the portable frame to be hereinafter described. The hand saw 1 comprises a saw blade 2, an electric motor 3 driving the saw blade 2 in any conventional manner, not shown. A handle 4 is secured to the casing of the electric motor 3 and carries the electric cord 5 leading to the source of the electro-motive force, not shown. It is customary to secure the handle 4 to the casing of the electric motor 3 by means of machine screws. A lug denoted by the numeral 6 extends from the casing of the electric motor 3 at one side of the saw blade 2 and has a threaded hole 7 therein into which a guide handle not shown is usually secured by means of a screw 8.

My portable frame comprises a clamp 9, a standard 10 and a carriage 11. The clamp 9 comprises a woodclamping mechanism provided by the horizontally extending jaws 12 and 13. Said jaws are spaced from each other so as to receive the edge of a board of a table therebetween. As shown in the drawing the jaw 12 rests upon a board 14 while the second jaw 13 is spaced therefrom. Clamp screws 15 are threaded into the flange 13 so that they may be readily screwed up tightly against the underside of the board 14 thereby securing the clamp 9 thereto.

The standard 10 comprises a column 17 and a supporting arm 18, the latter extending substantially in parallelism with the board 14, a reduced end 19 of the column 17 being fixedly secured into the clamp 9. A cylindrical portion 20 of the clamp 9 is formed with a longitudinal slot 21 and is an integral part of the clamp 9, as clearly shown in Figure 4. Lugs 22 extend on the opposite sides of the slot 21 and have registering and oppositely threaded holes therein. A screw 23 is correspondingly threaded at the opposite ends thereof, so as to be adapted to simultaneously engage the oppositely threaded holes in the lugs 22. When the screw 23 is turned the lugs 22 are simultaneously moved away or toward each other, thereby releasing the reduced portion 19 of the column 17 or securely clamping the same in the desired position. The clamping screw 23 is provided with a wrench 24 so as to supply additional leverage for turning the screw. The supporting arm 18 is secured to the top of the column 17 by means of machine screws 25 or by any other conventional means.

The carriage 11 comprises a slide block 26, having a passage therethrough corresponding to the cross sectional outline of the supporting arm 18, as is clearly illustrated in Figure 2. A boss 27 is disposed on the underside of the slide block 26 and has a threaded hole therein. A bracket 28 depends from the boss 27, a horizontal portion 29 thereof being secured to the boss 27 by means of a machine screw 30. Opposite the horizontal portion 29 and in parallelism therewith is an extension 31 having a threaded hole therein so as to be secured to the lug 6 by means of machine screws 8. A horizontal bracing arm 32 extends below the horizontal portion 29, the free end of said arm being re-bent and having a threaded hole therein, so as to be held in place by another machine screw 33, extending through the handle 4 into the casing of the handsaw 1.

The assembly of the device and the adaptation of the portable saw to stationary use is readily effected by removing the screws 33 and 8 then bringing the saw into alignment with the holes in the horizontal bracing arm 32 and extension 31, then securing the saw thereto by tightening the screws 8 and 33. The bracket 28 is now supported on the carriage 11 by means of the machine screw 30. The slide box 26 is slidable on the supporting arm 18, and moves the electric saw therewith. The clamp 9 is secured to any board 14 as heretofore described. The column 17 is adjusted to the proper height relative to the board 14. In order to further facilitate proper adjustment of the column 17 a graduated scale 34 is marked on the reduced portion 19. After adjustment the turning of the wrench 24 securely clamps the column in place in the cylindrical portion 20 of the clamp 9.

The position of the horizontal supporting arm 18 thereon is angularly adjustable by turning the column 17 therein until a punch mark or cut 35 thereon is brought into alignment with angle marks 36, impressed upon the top of the cylindrical portion 20. The angles are marked 30°, 45°, 60° and 90° corresponding to the respective miter cuts that may be made on the average construction job.

The operation of the saw is just as simple as that of any portable saw. The wood to be cut is placed on the board 14 while the saw is withdrawn to a position near to the free end of the supporting arm 18. After the adjustment of the woodwork so that the outline marks are in alignment with the saw blade 2 the machine is operated by simply turning an electric switch and advancing the saw 1 with the carriage 11 on the supporting arm 18. In case the saw is to be used for ripping or the like operation the carriage 11 may be fixedly secured to the supporting arm by means of a set screw 37 extending through the upper wall of the slide block 36. It is apparent that when the set screw 37 is unscrewed the block is freely slidable on the supporting arm while the tightening of the set screw will prevent any sliding of the block thereon. Sometimes it is desirable to fix the saw in different angular positions which may be readily effected by loosening the machine screw 30 and pivotting the bracket 28 and the whole electric saw 1 therewith around said screw until the saw assumes the desired angular position, then by tightening up the machine screw 30 and 37 both the saw and the carriage are fixed and the cutting is now effected by moving the wood against the saw blade 2 at any desired angle.

The removal of the electric saw 1 from the carriage 11 is accomplished by loosening the screw 30 and sliding the bracket 28 horizontally until the screw clears a slot 39 in the horizontal bracket portion 29. A slot 40 is cut into the jaw 12 for obviating any injury to the saw blade 2 that may be caused by the blade striking the metal jaw.

Every cut in any kind of woodwork may be readily and accurately made because the depth of the cut is readily determined by the graduated scale 34, the angularity of the cut is determined by the angular scale 36 and the length of the cut may be readily read on the graduation 38, marked on the side of the supporting arm so as to indicate the extent of sliding movement of the block thereon.

It will be recognized that a particularly facile device is provided to accomplish the accurate work of a table saw with a portable power saw by the employment of the above described portable support.

The device combines light weight, sensitivity of measurement with a ruggedness of construction and positiveness of operation especially adapting it for its use. The device may be carried by one man, and while it is readily employed for guiding and carrying a portable saw it does not change the portable character of the saw. Being a unitary character the device requires no careful setting up or carefully designed working table, it may be attached to any horizontal board or table and lends itself to effective application by the labor ordinarily available.

Having thus described my invention, what I now claim as novel and desire to secure by Letters Patent is:

In a portable frame for power driven portable tools; clamping means; a standard having an arm extending therefrom and being adjustably supported in said clamping means; a carriage slidable on said arm; a bracket provided with upper and lower horizontally extending arms, said bracket being attached to and depending from said carriage by said upper arm, and means carried by said lower arm for detachably securing said portable tool thereon.

In testimony whereof I affix my signature.

THERON L. HEDGPETH.